July 20, 1943.　　R. CADWALLADER　　2,324,677
VEHICLE BODY
Filed May 17, 1939　　6 Sheets-Sheet 1
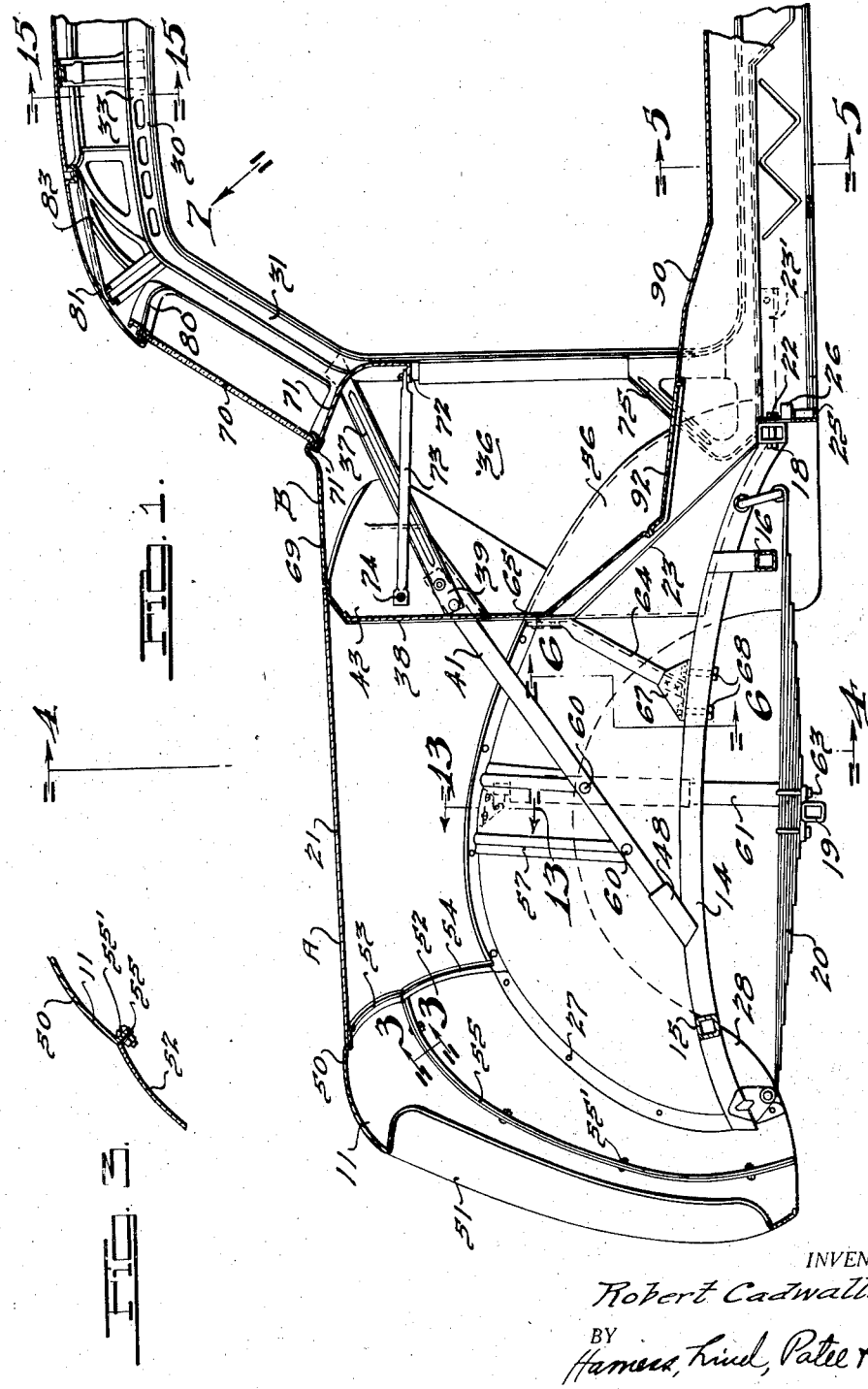
INVENTOR.
Robert Cadwallader
BY
ATTORNEYS.

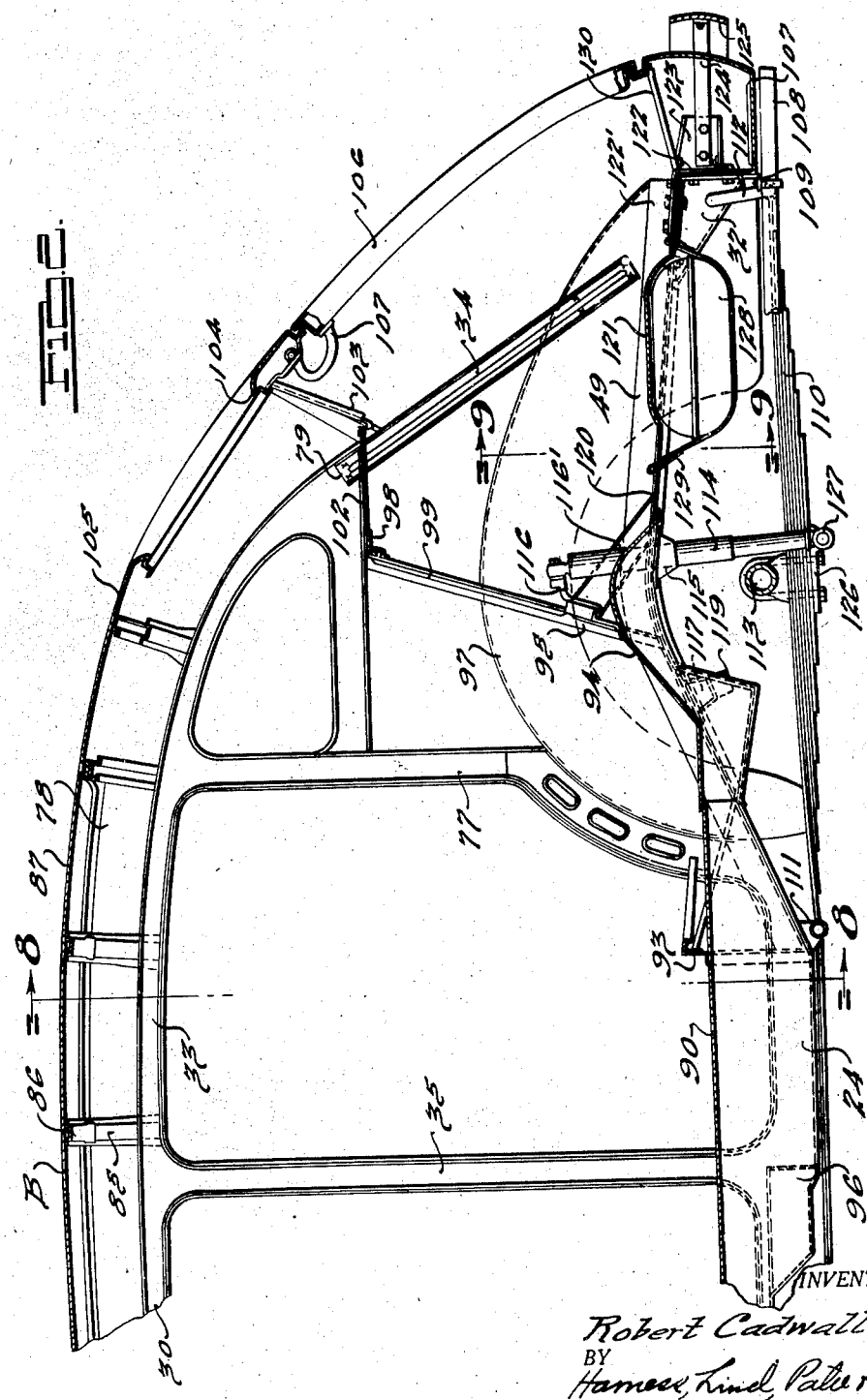

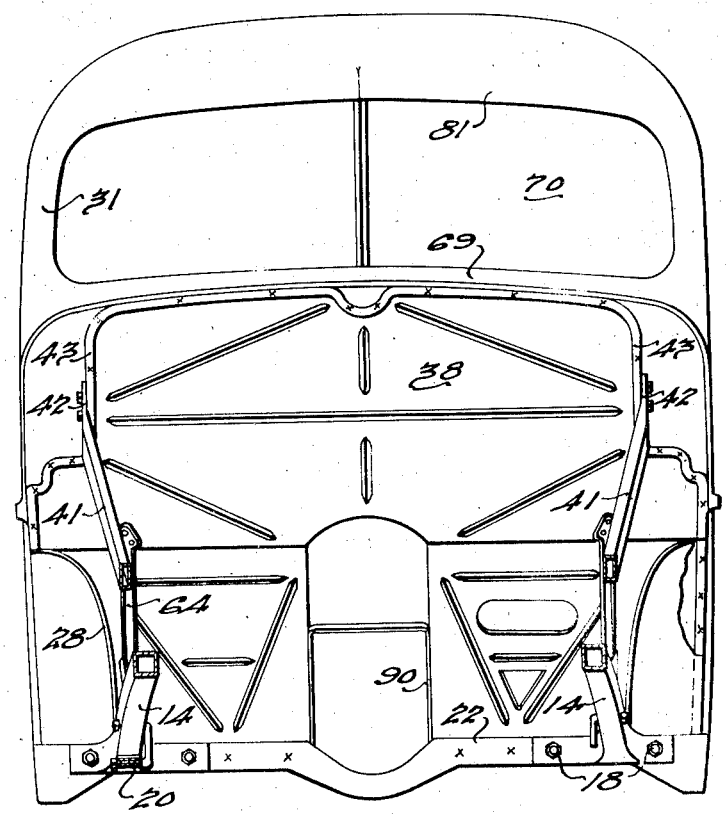
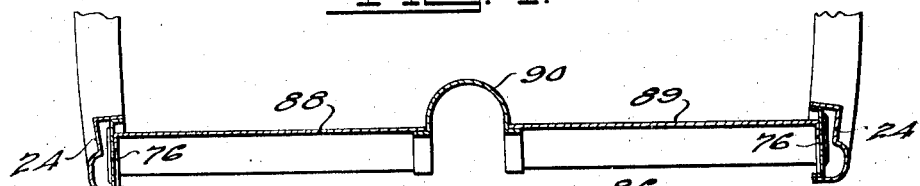
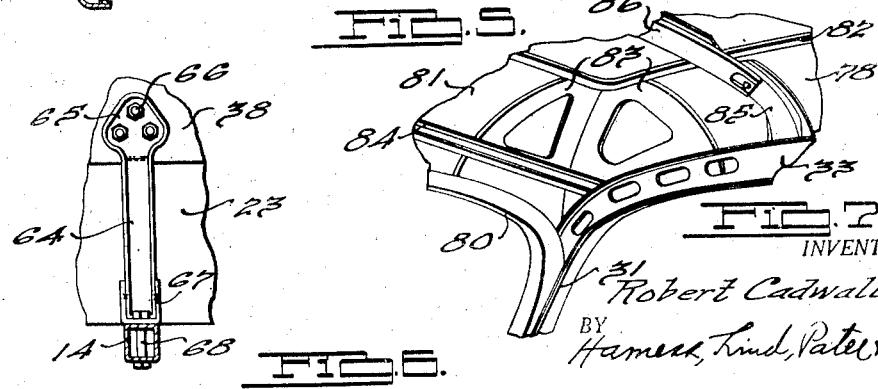

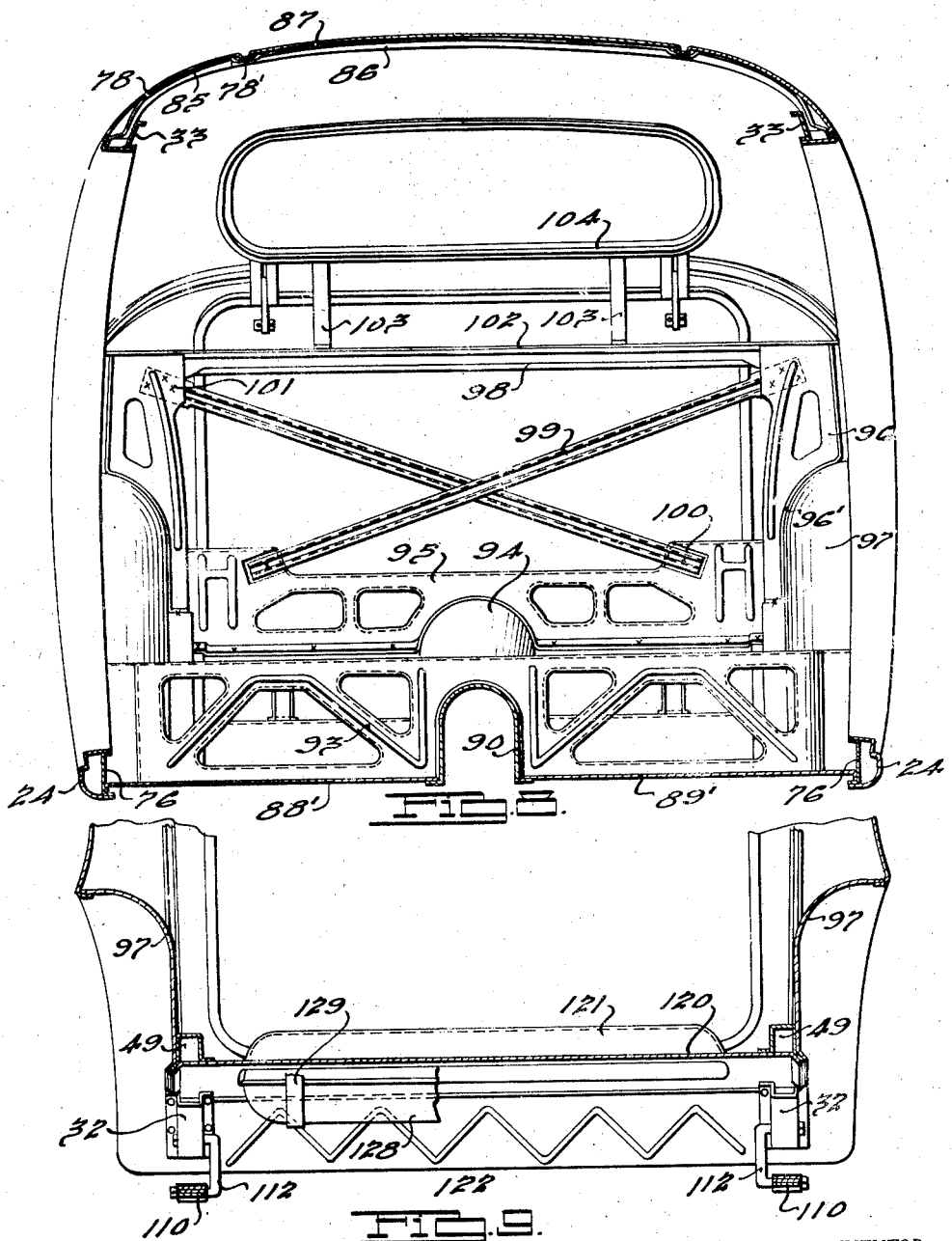

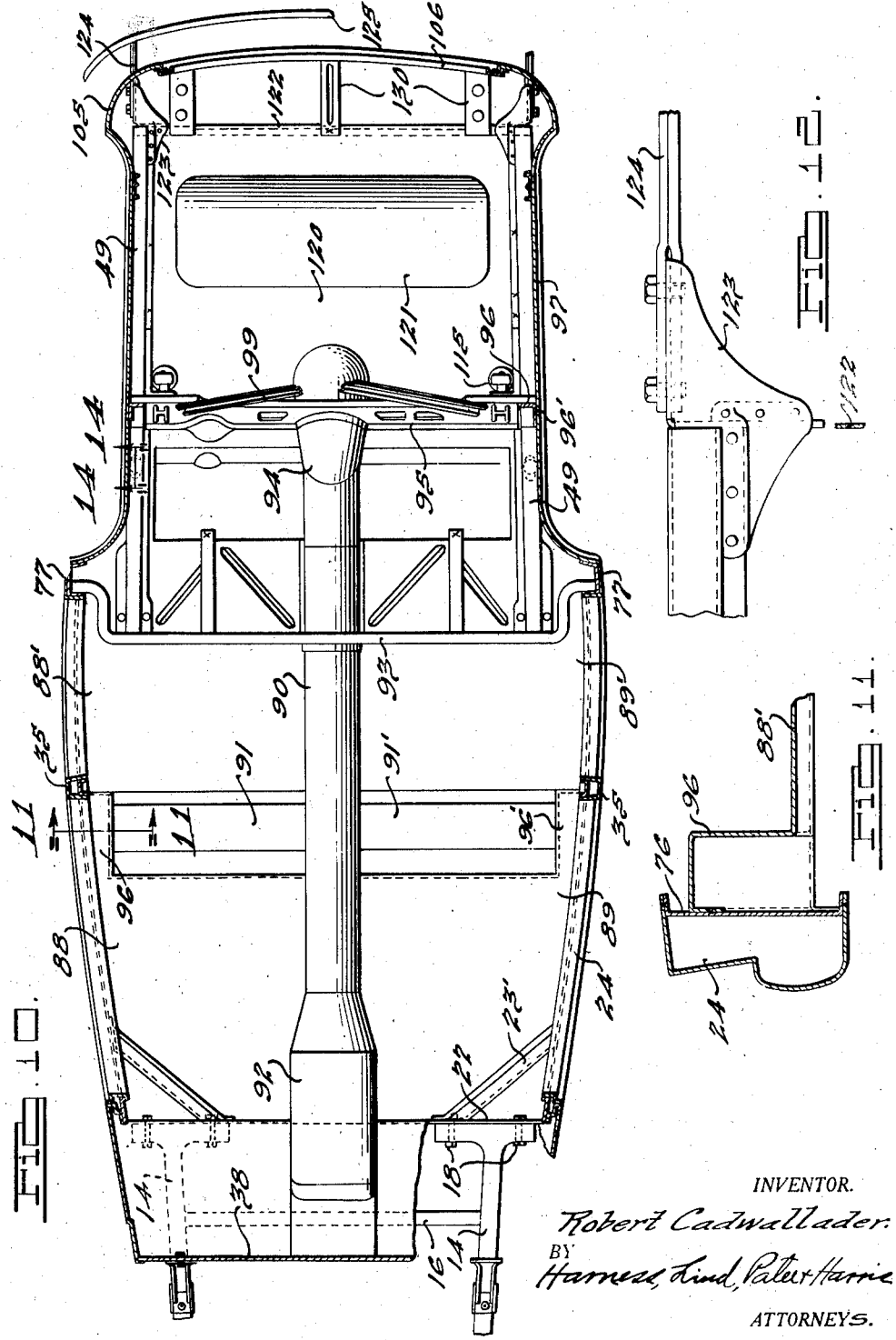

July 20, 1943. R. CADWALLADER 2,324,677
VEHICLE BODY
Filed May 17, 1939 6 Sheets-Sheet 6
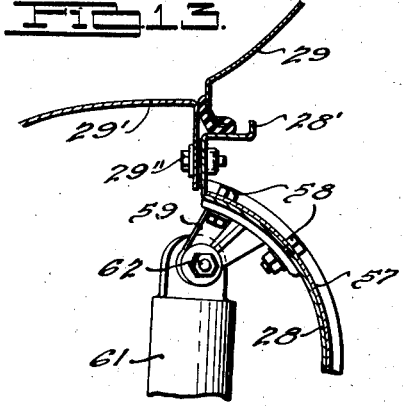
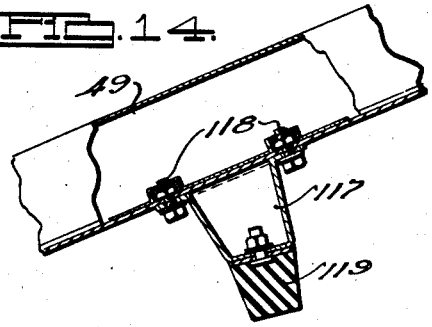
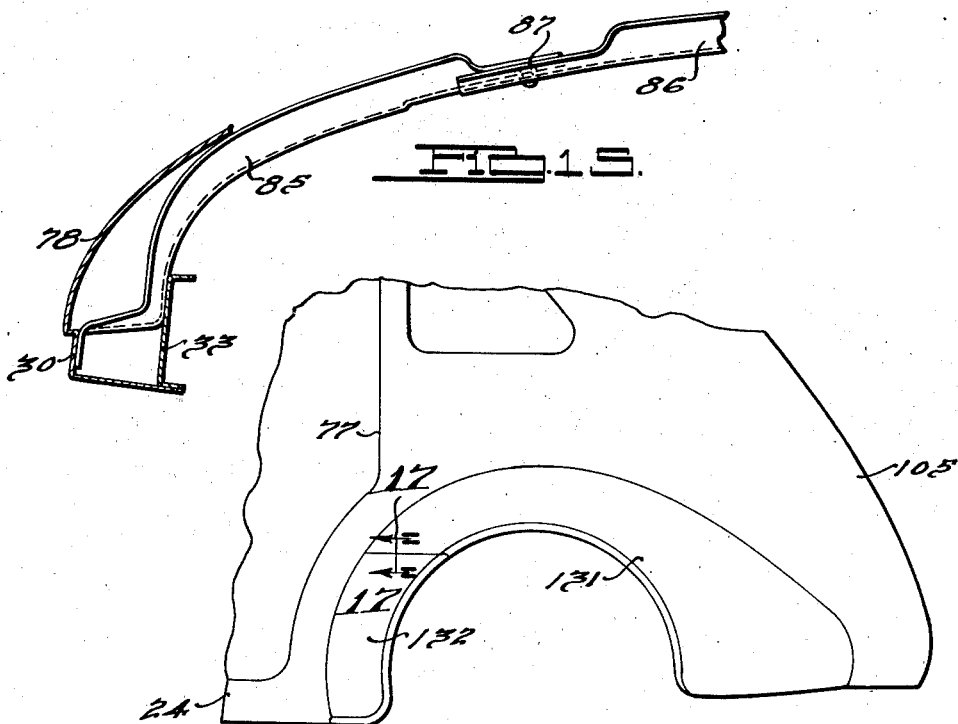
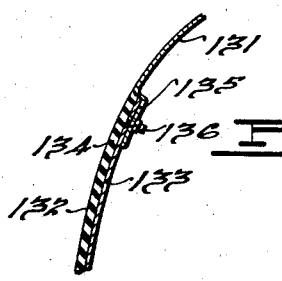
INVENTOR.
Robert Cadwallader.
BY
ATTORNEYS.

Patented July 20, 1943

2,324,677

UNITED STATES PATENT OFFICE 2,324,677

VEHICLE BODY

Robert Cadwallader, Detroit, Mich., assignor to Chrysler Corporation, Highland Park, Mich., a corporation of Delaware Application May 17, 1939, Serial No. 274,243

4 Claims. (Cl. 296—28)

This invention relates to vehicles and refers more particularly to improvements in motor vehicles.

One object of my invention is to provide an improved motor vehicle of relatively light weight and having improved characteristics of strength and rigidity.

A further object of my invention is to provide an improved body structure arranged to efficiently absorb and distribute the stresses incident to the motor vehicle load and road shocks without the use of an internal frame.

Another object of my invention is to provide improved means for transferring a portion of the load at the front of the vehicle directly to the body structure enabling the use of a frame structure as such to be dispensed with.

I preferably provide a body having a stressed skin suitably reinforced to absorb the loads transmitted thereto incident to the driving of the vehicle. Front and rear subframes are provided to facilitate mounting of the suspension springs and to suitably strengthen the body at these points and struts are provided between the front portion of the forward sub-frame, in proximity to the front wheel load supports, and the front door columns so that the stresses at the forward end of the frame are transferred through the struts to the columns and roof rails which extend rearwardly from the columns near the top of the vehicle body structure. As an important feature of this part of my invention, these struts are removable for ease of assembly and replacement.

An additional object of my invention, in its more limited aspects, is to provide a removable front end vehicle unit capable of attachment during assembly with the main body portion of the vehicle. This unit preferably supports the power plant, front wheel assemblies and parts incident thereto. The body unit preferably is a unitary structure of built-up panels and reinforcing elements and it has no separate frame or chassis. This type of multiple unit construction eliminates the present long chassis assembly line since the vehicle is divided into two main parts, the body unit and the power plant unit. The front and rear ends may be assembled or built up more efficiently and economically since they are more accessible and more easily handled. By reason of my invention the vehicle is less costly to fabricate, assemble, service, repair and ship. While many of the improvements incident to my invention may be realized by extending the vehicle frame for the full length of the car, I preferably provide for an improved fabrication or connection between the front and rear sub-frame portions whether the body is attached to the rear sub-frame portion or built up as a unitary structure therewith.

Further objects and advantages of my invention reside in the novel combination and arrangement of parts as more particularly hereinafter set forth, reference being had to the accompanying drawings which illustrate several embodiments of my invention and in which:

Fig. 1 is a sectional elevational view of the forward portion of the vehicle body and frame.

Fig. 2 is a sectional elevational view of the rear portion of the vehicle body and frame.

Fig. 3 is a sectional view along the line 3—3 of Fig. 1 showing the joint between the radiator shell and headlight panel.

Fig. 4 is a sectional view along line 4—4 of Fig. 1 showing the construction of the cowl portion of the body.

Fig. 5 is a sectional view along the line 5—5 of Fig. 1 showing the floor and tunnel construction at this point.

Fig. 6 is a sectional view along line 6—6 of Fig. 1 showing the bracing at this point.

Fig. 7 is a detail of the roof and pillar construction at the front of the vehicle, as indicated by the arrow designated 7 in Fig. 1.

Fig. 8 is a sectional view along the line 8—8 of Fig. 2 showing the rear seat supporting structure and bracing.

Fig. 9 is a sectional view along line 9—9 of Fig. 2 showing the fuel tank mounting means.

Fig. 10 is a plan view of the floor structure.

Fig. 11 is a sectional view along the line 11—11 of Fig. 10.

Fig. 12 is an enlarged detail view of the rear bumper bracket.

Fig. 13 is an enlarged sectional detail of the shock absorber mounting bracket, taken along the line 13—13 of Fig. 1.

Fig. 14 is an enlarged sectional view taken along the line 14—14 of Fig. 10.

Fig. 15 is a detail section of the roof construction taken along the line 15—15 of Fig. 1.

Fig. 16 is a detail of the rear fender construction.

Fig. 17 is a section along the line 17—17 of Fig. 16.

Referring to the drawings, I have illustrated my invention as comprising a forward unit A and a rear unit B. In this embodiment of my invention the front unit preferably embodies a frame structure C adapted to support a power plant (not shown) which, as is now customary, may comprise engine, radiator, clutch and transmission.

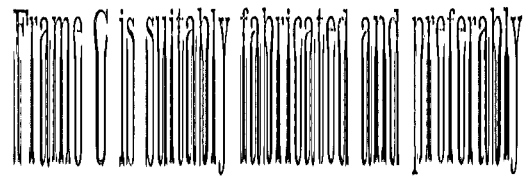

has the main side longitudinal rails 14 of box section form, connected at suitable points by the cross members 15, 16 for bracing the side rails and supporting the power plant. Frame C is yieldingly supported on ground wheels by any appropriate means such as axle 19 and the side spring assemblies 20 shackled to rails 14. The power plant is enclosed by a hood structure 21 adapted to conform with the forwardly projecting cowl paneling of rear unit B as will presently be more apparent.

The rear ends of rails 14 are T-shaped as shown in Fig. 10 and are connected by bolts 18 to the vertical flange 22 of the inclined floor board 23, the rails 14 being preferably set inwardly from the ends of member 22. Channeled corner braces 23' suitably reinforce the structure at this point as indicated in Fig. 10.

The body unit B is somewhat diagrammatically shown in Figs. 1 and 2 as a four-door sedan style although it will be understood that various body styles may be employed. This unit is illustrated as comprising a built-up composite frame and body having the bottom side sills 24 connected at their front ends by welding to a rearwardly opening channeled cross member 25. The member 25 is connected to the upper face of a sill 24 and to the respective frame member 14 thereby making a rigid construction at this point.

The unit B, in addition to the sills 24, is further provided with compression resisting top longitudinals or rails of any suitable fabrication, these top members being generally designated at 30 and preferably extending rearwardly from the windshield corner posts 31 to receive the load at or in proximity to the rear wheel spring supports 32 through the reinforcing rails 33 and 34. A further brace 35 connects intermediate portions of each sill 24 and a top rail 30, the vertical braces 35 serving as door posts while top rails 30 support the usual body roof.

The forward ends of sills 24 and rails 30 are further connected by the front door column or post 31 of any well known structure rearwardly adjacent the cowl structure 36, each roof rail 30 extending forwardly and downwardly to provide the aforesaid post 31, the latter then further extending forwardly and downwardly by a channeled cowl portion 37 adapted for connection, preferably by welding, to the transversely extending dash structure 38. To this end, the forwardly terminating end of each rail portion 37 is secured at 39 to the dash 38. It will be noted that posts 31 branch near the bottom of the windshield to provide lower columns 31 and forwardly extending windshield post projections 37. Columns 31 may be made of relatively light structural formation of any suitable fabrication.

In order to complete the truss-like body structure so that a portion of the load at rails 14 is transmitted during normal loading conditions directly to the roof rails 30, I have provided a channeled compression strut 41 at each side of the vehicle. Each strut is structurally connected at its lower end to a rail 14 and at its upper end to dash 38 at 39. While struts 41 may be built into the vehicle as extensions of rail portions 37, it is a feature of my invention in a more limited the power plant and to facilitate assembly and manufacture of the vehicle especially where units A and B are adapted for separate assembly.

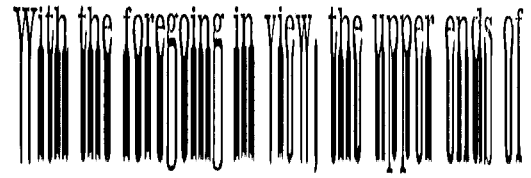

struts 41 are angled at 42 parallel to the indented portion 43 of the cowl for removable connection thereto by one or more bolts which also extend through webs 39 of rail cowl portions 37 as shown in Figs. 1 and 4.

It will be noted that each strut 41 is structurally continuous with the associated rail portion 37 so that loads transferred through the struts pass directly to the roof rails. The struts 41 slope forwardly and downwardly, preferably in approximate axial alignment with rail portions 37 for connection with the rails 14 respectively. In the Fig. 1 embodiment, the struts connect with the rails near their forward ends, each strut having its terminal end welded in a socket 48 which is in turn welded to the rail 14.

By reason of such arrangement, much of the bending in rails 14 caused by the vertical load through the supports for springs 20 is taken by the strut 41 acting in compression and transferring this load portion directly through rail portions 37, 31 thence along the main portions of roof rails 30 to the rear sub-frame rails 49 through brace structures 33 and 34. Wheel shock loads on the front sub-frame will be similarly distributed in part through the body structure as well as head-on collision forces.

The radiator shell assembly 11 comprises a centrally disposed shell member 50 having an opening 51 for the reception of a suitable grille (not shown). The member 50 has a rearwardly disposed ledge 53 on which the engine compartment hood 29 is adapted to seat and a downwardly extending flange 55 which is adapted to mate with a complementary flange of the side shell member 52 to which it is fastened by suitable means such as the stove bolts 55'. The member 52 is secured by fastening means 27 to the front wheel housing member 28 and has a ledge 54 in registry with the ledge 53.

The member 28 is suitably attached to the front end of the rail 14 and to the lower indented portion 56 of the cowl structure and has a brace member 57 (Fig. 13) bolted thereto by bolts 58 which also secure a bracket 59 to the wheel housing structure. The brace member 57 is bolted at its lower end to the strut 41 by bolts 60 to reinforce the wheel house structure to withstand the thrust of a shock absorber 61. The latter is of the well known direct action type and is pivotally secured at 62 to the bracket 59 and at 63 to the axle 19.

The wheel house member 28 has an upwardly extending flange portion 28' to which the fender 29' is bolted by bolts 29" and which forms a seat for the lower edge of the hood 29 as illustrated in Fig. 13.

The cowl structure is braced near the rear end of the rails 14 by a pair of braces 64 (see Figs. 1 and 6). Each brace 64 has a web portion 65 which is bent flush with the vertical portion of the dash 38 to which it is secured by bolts 66. The other end of brace 64 is welded to each leg of a U-shaped bracket 67 bolted to the rail 14 by bolts 68. The braces 64 further rigidify the front assembly and help transmit and distribute the compressive forces incident to the thrust of the front road wheels upwardly through the shield 70 which is of the well known V-type. An instrument panel 71 is welded to the top cowl panel 69 at 71' and extends rearwardly and downwardly terminating in a flange 72. A strut 73 bolted at 74 to the indented portion 43 of the side cowl structure is secured at its other end to the flange 72 and braces the panel 71 at each side thereof.

The forward door post 31 is secured at the bottom thereof to the bottom body sill 24 and has a triangular brace member 75 which connects the post 31, cowl 36 and sill 24 at this point.

The lower body sill 24 has a channel-shaped internal reinforcing member 76 coextensive therewith. The sill 24 terminates rearwardly at the bottom of the rear door post 77 to which it is secured as shown in Figs. 2 and 10.

The top rail extends rearwardly and downwardly at the rear quarter portion of the body, the reinforcing rail 33 being welded to the strut 34 at 79 as aforesaid. At the top of the front door pillar 31 (see Fig. 7) the member 33 is welded thereto, together with the transversely extending header member 80. The front roof quarter panel 81 and the side roof quarter panel 78 are joined to each other, and to the header 80 and member 33 and are braced in the vicinity of the front corner of the body by a pair of triangular brace members 83 as shown in Figs. 1 and 7.

The roof quarter panels 78 and 81 have a continuous channeled flange 82 which is adapted to receive the marginal flange of a roof panel 87 as shown in Fig. 8.

Figs. 2, 7 and 15 illustrate details of the roof bracing means which comprises a plurality of transverse brace members spaced longitudinally of the body between the top rails. The front brace member 84 is continuous while the others consist of a central brace member 86 secured at each of its ends to a member 85 welded to the roof quarter panel 78 and to the reinforcing channel 33 as indicated in Fig. 15. The members 85 and 86 have reduced overlapping portions secured together at 87, said reduced portions providing a recess for receiving the roof joint flange 78' as shown in Fig. 8.

The lower body sills 24 each have a reinforcing member 76 of channel form welded thereto. A drive shaft tunnel 90 is disposed longitudinally of the body passenger carrying compartment and is attached to the dash 38 at its front end from whence it inclines downwardly and extends rearwardly to the vicinity of the rear seat back support 95 where it terminates in a "bump" which accommodates the rear axle differential housing (not shown). The tunnel 90 has a removal panel 92 at its front end to permit servicing of the vehicle clutch.

The floor consists of a pair of front compartment panels 88, 89 which are welded to the tunnel 90 and the members 76, as shown in Fig. 5, and extend rearwardly to the vicinity of the door pillar 35 (Figs. 10 and 11). The panels 88, 89 terminate at the sides of the body in the front seat cushion supporting portions 96, 96' respectively between which is provided the depressed portions 91, 91' at each side of the tunnel 90. The portions 91, 91' are adapted to accommodate the feet of the rear seat passengers. A second pair of floor panels 88', 89' extend from the rear of the front seat support to the rear seat back cushion support 95 as illustrated in Figs. 8 and 10. The front portion of the rear seat cushion (not shown) is adapted to be supported on the member 93 which extends transversely across the body at the rear door pillars 77 and reinforces the body structure at this location. The member 93 is welded to the pillars 77, to the tunnel 90 and to the floor panels 88', 89', as shown in Figs. 8 and 10, and at each side it is connected to the rear wheel house 97 by welding to the members 96 which have a flange 96' welded to the wheel houses along the curvature thereof.

The rear of the body in the vicinity of the rear seat back is further strengthened by the transverse X-brace members 99 which are welded to the member 95 at 100, and to the members 96 at 101. The members 96 are also connected by the member 98 which extends across the body at the top of the rear seat back supporting structure and forms the front support for a shelf 102 which is supported at the rear by a pair of brackets 103 which are welded thereto and to the flange 104 of the rear window, as illustrated in Figs. 2 and 9.

The members 93, 95, as well as the other brace and reinforcing members of the body structure, are provided with suitable beads during the stamping operation to increase their strength and stiffness.

In rear of the rear seat back supporting and body reinforcing structures, a rear compartment floor panel 120 extends to the rear of the subframe sills 49 where it terminates in a downwardly bent flange 122. The rear outer body panel 105 curves downwardly over the rear compartment and terminates at the bottom thereof in a flange 107 which is joined to the flange 122. The structure is reinforced at each side by a bracket 123 welded to the flange 122 (Fig. 12) and bolted to the inner flange of the channel portion of the sill 49 by bolts 122' which also pass through the floor panel 120. The brackets 123 also support the rear bumper 125 through the intermediary of the struts 124 which are bolted to the brackets as shown.

The rear of the body is further reinforced at the corners by the brackets 32 which are attached to the flange 122 and the sills 49 (Figs. 2 and 9) and support the rear spring shackle 112. The rear springs 110 are fastened to the body at their forward ends by brackets 111 attached to the forward ends of the sills 49 at the lower ends of the rear pillars 77. The rear axle 113 is supported on the body by the springs 110 to which it is attached by the usual U-bolts. The rear shocks absorbers 114 are pivotally attached to the spring plates 126 at 127 and are pivotally connected at their top ends to a bracket 116 mounted on the member 95. An inclined brace 116' is welded to the member 95 and to the sill 49 at this location on each side of the member 95 to strengthen the structure sufficiently to withstand the thrust of the shock absorbers. A rubber grommet 115 is provided in the floor panel 120 at each side thereof to permit movement of the shock absorbers and seal the rear compartment upon the entry of dust and water.

Access to the rear compartment may be had through the door 106 hinged at 107 to the rear panel 105. At the bottom of the door 106 a plurality of braces 130 are welded to the floor panel 120 and to the bottom portion of the outer rear body panel 105 for strengthening purposes.

A "bump" 121 is provided in the panel 120 to accommodate the fuel tank 128 which is retained in place by the usual straps 129 (Figs. 2, 9 and 10).

Just forwardly of the shock absorbers 114, a pair of brackets 117 (Fig. 14) are attached to the sills 49 by bolts 118, and support bumper blocks 119 which are adapted to contact the upper leaf of each spring 110 upon extreme upward movement of the axle 113.

Referring now to Figs. 16 and 17 which illustrate a portion of the outer body at the rear wheel, it will be noted that the rear fender comprises a main portion 131 and a separable forward portion 132. The latter consists of a metal backing member 133 to which is attached (by cementing or vulcanizing or other suitable means) a rubber guard element 134. Member 131 has a depressed flange 135 to which the portion 132 is attached by the bolts 136. The entire assembly is suitably fastened to the outer marginal portion of the rear wheel house 97 as is common. While running boards may be used on the herein described body, they are unnecessary for easy ingress and egress because of the low floor. The rubber element 134 therefore acts as a stone guard and protects the fender from damage by flying stones and gravel thrown upwardly during travel of the car.

It will be apparent that I have provided a body wherein a truss construction is employed to resist the forces applied by the road wheels through rugged, yet light weight, structural members in which the primary stresses are simple tension and/or compression stresses, the severe bending stresses present in conventional types of bodies being largely eliminated. Thus, the body longitudinal lower side sills are in tension and the forward and rear inclined strut members as well as the roof members are in compression when a static load is on the wheels.

The spring reactions are transmitted to, and absorbed in, the body structure in an improved manner, the front spring reaction and engine loads being transmitted directly through the upwardly and rearwardly inclined members 37, 41 and 64 to the front door pillars 31 and top rails 30. The body skin or shell, in many instances, is constructed to take a portion of the loads, thereby minimizing the body weight.

By dispensing with the conventional chassis rails and transmitting the driving stresses directly to the body structure, a lighter and more economical, yet rugged, body is the result.

By providing a two-piece body structure with an easily separable front end, the vehicle is more easily repaired and serviced, and the vehicle may be assembled in two parts then shipped to a distant point for assembly into a complete vehicle if desired.

Various modifications and changes will readily be apparent from the teachings of my invention and it is not intended to limit the same to the foregoing illustrative embodiment, the invention in its broader aspects being defined in the claims appended hereto.

What I claim is:

1. In a motor vehicle body structure having a cowl structure forwardly of the driver's compartment, an engine and wheel supporting frame extending forwardly of said cowl structure; said cowl structure comprising a stamping having a transverse dash portion and inwardly offset portions at each side thereof; a strut member structurally connecting each of said offset portions and said frame at each side of said body structure; and an additional strut member structurally connecting said dash and said frame at each side of said body structure.

2. In a motor vehicle body structure having a driver's compartment, pillars at each side of the forward end of said compartment; a transverse brace member interconnecting said pillars; a cowl structure forwardly of said compartment; an engine and wheel supporting frame extending forwardly of said cowl structure; said cowl structure having inwardly offset portions at each side thereof; a strut member structurally connecting each of said offset portions and said frame at each side of said body structure, and additional strut members structurally connecting said offset portions and said transverse brace member.

3. In a motor vehicle, a strut type body structure; a frame extending forwardly of said body structure for supporting an engine; a front wheel housing on one side of said frame; means including an axle carried by said frame for yieldingly supporting the front end of said vehicle; a shock absorber connected between said axle and body structure for limiting abnormal displacement of said axle relative to said frame; a rearwardly inclined compression resisting strut rising from said frame structure in the vicinity of said shock absorber for resisting distortion of said frame incident to said abnormal axle displacements; a brace member extending laterally from said inclined strut and connecting said inclined strut and said wheel housing, and means for transmitting the load on said strut to upper portions of said body structure.

4. In a strut type motor vehicle body structure having a driver's compartment and a cowl structure, an engine supporting frame extending forwardly of said compartment; a front wheel housing structure at one side of said frame; a strut member structurally connecting said frame and said cowl structure at one side of said body; a shock absorber connection bracket secured to said wheel housing structure; and a structural reinforcing member interconnecting said wheel housing structure and said strut member in the region of said bracket, whereby the thrust of said shock absorber is distributed through said cowl and wheel housing structure.

ROBERT CADWALLADER.